(12) United States Patent
Geither et al.

(10) Patent No.: US 7,568,677 B2
(45) Date of Patent: Aug. 4, 2009

(54) AIR VALVE OPERATOR

(75) Inventors: Jeffrey Michael Geither, North Ridgeville, OH (US); Mark A. Bennett, Lagrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 352 days.

(21) Appl. No.: 11/448,693

(22) Filed: Jun. 7, 2006

(65) Prior Publication Data

US 2008/0001114 A1    Jan. 3, 2008

(51) Int. Cl.
*F16K 31/00* (2006.01)

(52) U.S. Cl. ............... 251/291; 251/319; 16/441; 74/548

(58) Field of Classification Search ........... 251/291, 251/319; 16/441, 433; 74/543, 548, 502
See application file for complete search history.

(56) References Cited

U.S. PATENT DOCUMENTS

| | | | | |
|---|---|---|---|---|
| 4,790,208 A | * | 12/1988 | Johnson | .................. 74/548 |
| 5,735,147 A | * | 4/1998 | Cattanach et al. | ............. 70/164 |
| 6,095,704 A | * | 8/2000 | Jaeger et al. | ................. 400/613 |
| 6,615,688 B2 | * | 9/2003 | Wessel | ....................... 74/551.9 |
| 6,685,281 B2 | | 2/2004 | MacGregor et al. | |
| D499,677 S | | 12/2004 | Kemer et al. | |
| 6,854,919 B2 | * | 2/2005 | Neumann et al. | ........... 403/326 |
| 2004/0032311 A1 | | 2/2004 | Forsythe | |

OTHER PUBLICATIONS

Bendix Service Data, SD-03-3411, Bendix MV-1 Modutrol, pp. 1-6, Mar. 2004.
Bendix Dash Control Modules, MV-3 dash control module, p. 29.

* cited by examiner

*Primary Examiner*—John K Fristoe, Jr.
(74) *Attorney, Agent, or Firm*—Calfee, Halter & Griswold LLP

(57) ABSTRACT

An operator for an air flow control device includes a button mounted on a plunger. The button is indexable at forty-five degree increments on the plunger. The button has a non-circular label area that is adapted to receive a non-circular label for the operator so as to present either a diamond shape or an octagon shape to a viewer of the button. The button can have either a snap fit or a threaded connection to the plunger.

10 Claims, 3 Drawing Sheets

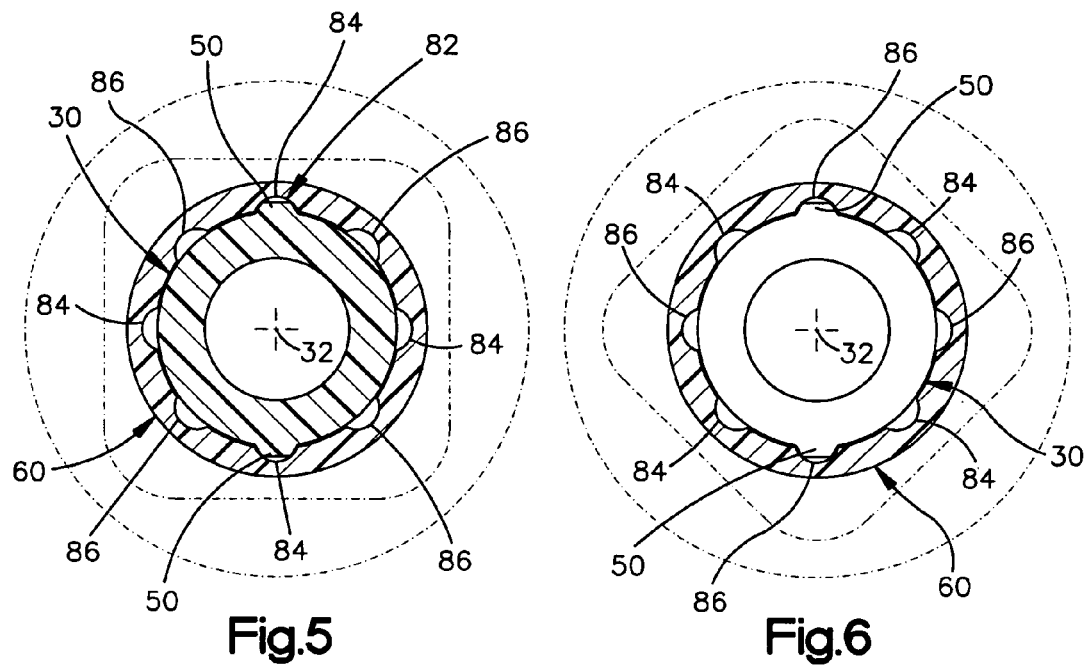
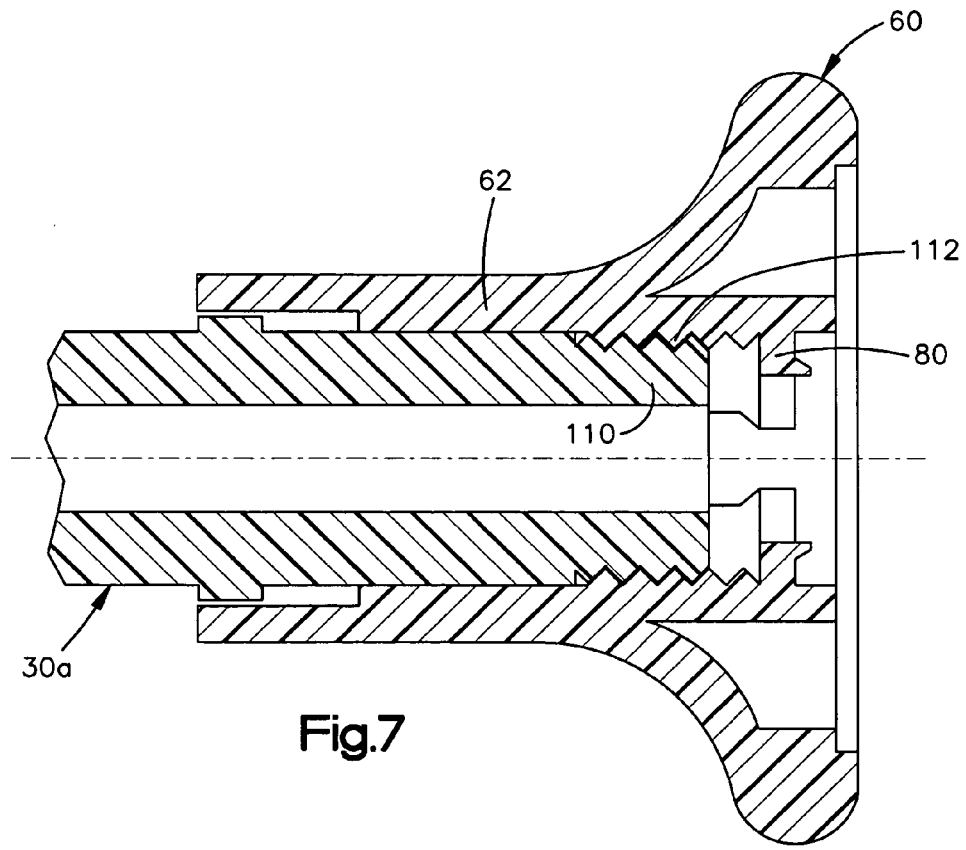

AIR VALVE OPERATOR

BACKGROUND OF THE INVENTION

This invention relates to operators for fluid flow control devices, such as valves, for example. In particular, this invention relates to push-pull operators for air valves, for example of the type including a manually engageable button mounted on a plunger for controlling the position of the plunger and thus the operation of the valve.

U.S. Pat. No. 4,790,208 shows a knob and shaft assembly for operating, for example, a vehicle air brake control valve. The assembly includes a knob having a front face and a barrel projecting from the face, and a shaft which is threadedly engaged with threads on the barrel. The assembly is provided with locking detents comprising protrusions on the shaft which are received within apertures on the barrel to releasably lock the knob to the shaft, thereby preventing the parts from being accidentally becoming disengaged. This also assures the proper orientation of the knob with respect to the shaft to permit indicia embossed on the knob to be easily read by the operator.

SUMMARY OF THE INVENTION

In one aspect this invention relates to a button for an operator for an air flow control device, comprising a hub portion for mounting on a plunger of the operator, and an engagement portion for manual engagement to apply force in a direction along the length of the plunger. The engagement portion of the button has a non-circular label area that is adapted to receive a non-circular label for the operator so as to present either a diamond shape or an octagon shape to a viewer of the button.

In another aspect the invention relates to a button for an operator for an air flow control device, comprising a hub portion for mounting on a first type of operator plunger, and a engagement portion for manual engagement to apply force in a direction along the length of the first type of plunger. The button has a detent portion enabling indexing of the button on the plunger at forty-five degree increments on the first type of plunger. The button includes a non-threaded securing portion for securing the button axially to the first type of plunger, and a threaded securing portion for securing the button to a second type of plunger.

In another aspect, the invention relates to an operator for an air flow control device, comprising a plunger that is movable in a direction along an axis to control flow of air through the device, and a manually engageable button on the plunger for controlling movement of the plunger. The plunger has a plunger detent portion that defines a first group of angular positions and a second group of index positions that alternate with the angular positions in the first group. The button has a button detent portion that cooperates with the plunger detent portion to releasably set the button on the plunger in any selected one of the first group or the second group of index positions relative to the plunger. The button has a non-circular label area that is adapted to receive a non-circular label for the operator so as to present either a diamond shape or an octagon shape to a viewer of the button.

In another aspect the invention relates to an assembly for operating first and second air valves of a vehicle. The assembly includes a first plunger that is movable in a direction along an axis to control flow of air through the first valve, and a manually engageable first button on the first plunger for controlling movement of the first plunger. The assembly also includes a second plunger that is movable in a direction along an axis to control flow of air through the second valve, and a manually engageable second button on the second plunger for controlling movement of the second plunger. Each one of the first and second plungers has an ovalized square recess for receiving an ovalized square label so as to present either a diamond shape or an octagon shape to a viewer of the button.

BRIEF DESCRIPTION OF THE DRAWINGS

Further features of the invention will be apparent to one of ordinary skill in the art to which the invention pertains, from a reading of the following description in conjunction with the attached drawings, in which:

FIGS. 5 and 6 are sectional views showing the operator indexed to two different positions; and FIG. 7 is a view similar to FIG. 4 of an operator that is a second embodiment of the invention.

DETAILED DESCRIPTION OF THE INVENTION

Figure 1:
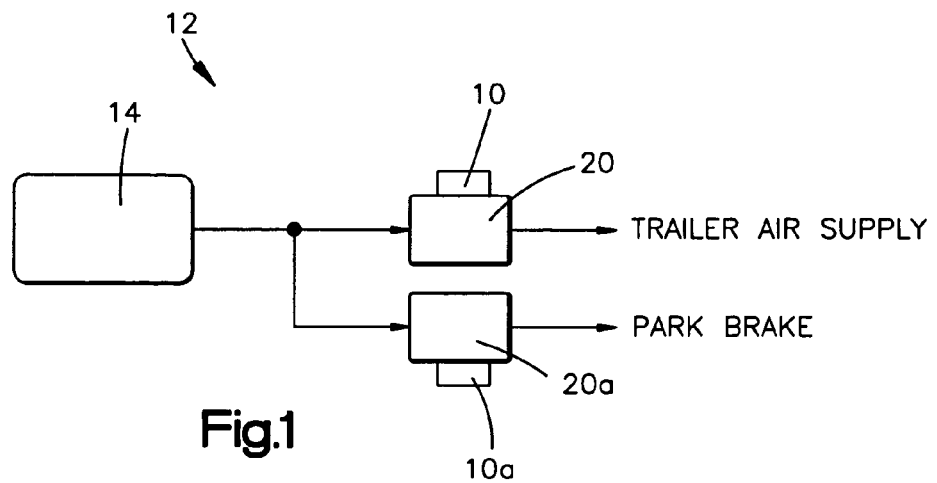
FIG. 1 is a schematic illustration of portion of a vehicle air brake system including a valve having an operator that is a first embodiment of the invention.

This invention relates to operators for fluid flow control devices, such as valves, for example. In particular, this invention relates to push-pull operators for air valves, for example of the type including a manually engageable button mounted on a stem for controlling the position of the stem and thus the operation of the valve. As representative of the invention, FIG. 1 illustrates schematically an exemplary valve operator 10 that is a first embodiment of the invention, shown as part of a vehicle braking system 12.

The braking system 12 includes a source 14 of air under pressure that may include a reservoir and/or a compressor. The air from the source 14 is directed to a trailer air supply valve 20. The operator 10 is associated with the trailer air supply valve 20 for manually actuating the valve 20. Air from the source 14 is also directed to a system park brake valve 20a. Another operator 10a is associated with the valve 20a for manually actuating the valve 20a. The operator 10a may be identical, or similar to, the operator 10, as discussed below.

Figure 2:
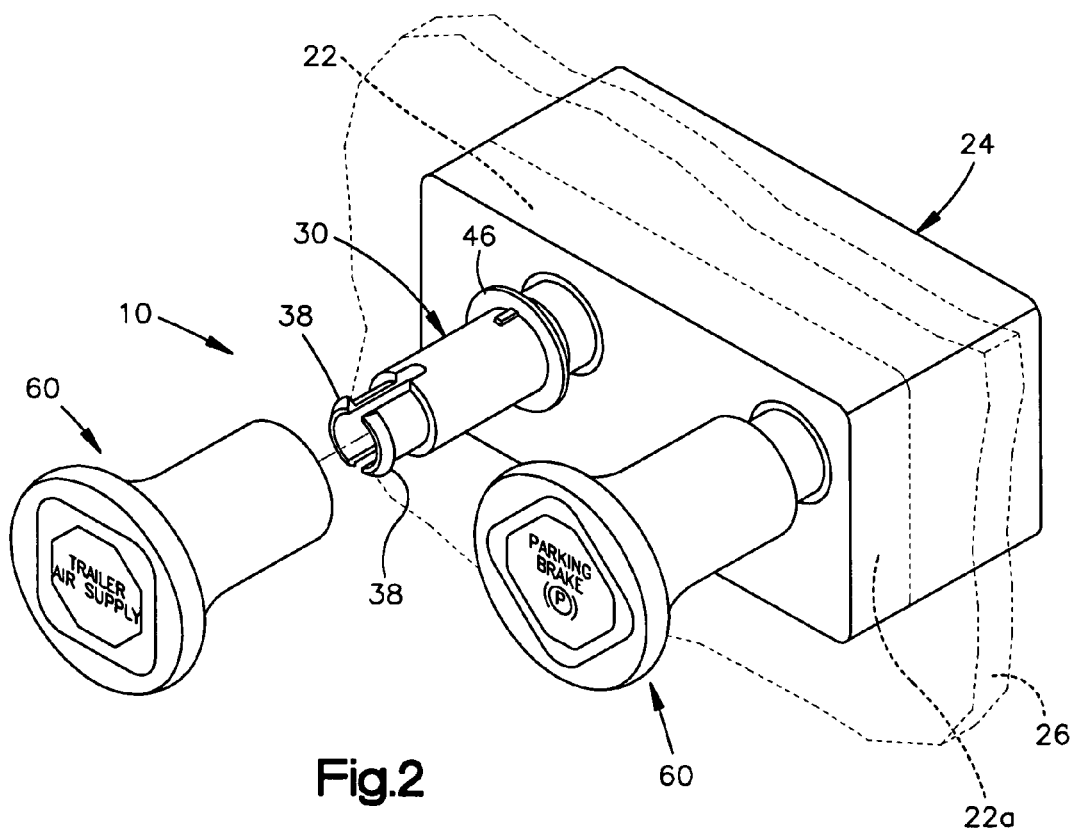
FIG. 2 is a pictorial illustration of a valve assembly mounted on a dashboard of the vehicle, including two valves having operators that are embodiments of the invention.

The valves 20 and 20a and their operators 10 and 10a are also shown in FIG. 2. The valves 20 and 20a are shown mounted together in a valve assembly 24. The valve assembly 24 is sometimes mounted generally horizontally in a dashboard or other portion of a vehicle, as shown partially at 26 in FIG. 2, and is sometimes mounted generally vertically in the dashboard.

As shown in FIG. 2, the operator 10 for the valve 20 presents a red, octagonal visual appearance, with one side of the octagon horizontal along the top. The operator 10a for the other valve 20a presents a yellow, diamond shaped appearance, with one vertex of the diamond at the top. This appearance of the two operators 10 and 10a is discussed below in detail. The valves 20 and 20a may be of a known construction not discussed herein, each including a respective valve body 22, 22a, for example.

Figure 4:
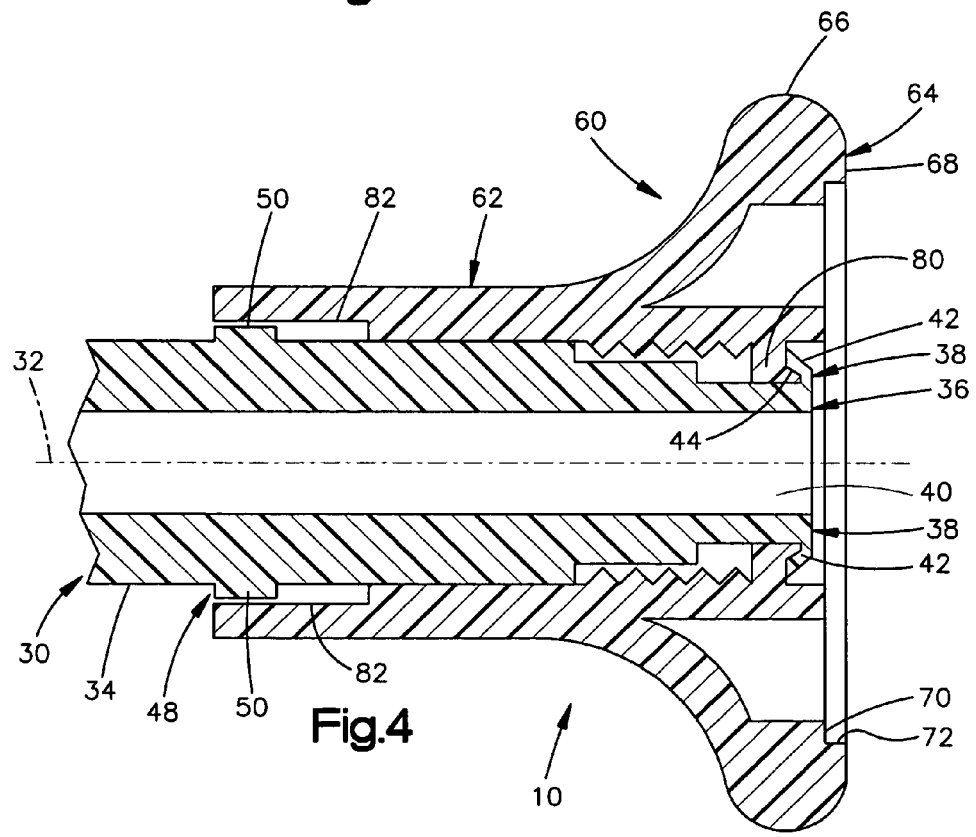
FIG. 4 is an enlarged longitudinal sectional view through a portion of the operator of FIG. 1.

The operator 10 (FIG. 4) includes a plunger 30. The operator 10 also includes a button 60 that is mounted on the plunger 30. The plunger 30 is supported on the valve 20 for movement relative to the valve body 22, upon pushing and pulling of the plunger 30 in a direction along an axis 32, to control flow of air through the valve. The plunger 30 is operated by manual force applied to the plunger. The force is applied via the button 60, described below in detail.

The plunger 30 has a generally cylindrical configuration extending from the body 22 of the valve 20, with a cylindrical outer surface 34. The plunger 30 has an outer end portion 36. The outer end portion 36 is formed of two arms 38 with a gap or slot 40 between them. Each arm 38 terminates in a cam surface 42 with a shoulder 44 behind the cam surface. The arms 38 are resiliently movable radially inward toward each other, to at least partially close the gap 40.

The plunger 30 has a collar 46 (FIG. 2) nearer to the body 22 of the valve 20 that extends radially outward from the outer surface 34. Axially outward of and adjacent to the collar is a detent portion 48 (FIG. 4) of the plunger 30. The detent portion 48 includes a plurality of detents, or locking tabs or index tabs, that project radially outward from the cylindrical outer surface 34 of the plunger 30. In the illustrated embodiment, two detents 50 are provided, diametrically opposite each other.

The button 60 has a barrel or hub 62, and an engagement portion or face portion 64. The engagement portion 64 of the button 60 is radially larger than the barrel 62 to provide for easy and firm grasping by the operator. The engagement portion 64 of the button 60 has a circular outer periphery 66 and has an outer major side surface 68 that faces away from the body 22 of the valve 20.

The engagement portion 64 of the button 60 has a label area or label recess 70 on the outer major side surface 68. The recess 70 is not circular like the outer periphery 66 of the button 60, although in other embodiments the recess could be circular. The non-circular recess 70 has an outer periphery 72 that has a first orientation relative to vertical, or to the valve body 22, when the button 30 is in any one of a first group of angular (rotational) positions relative to the valve body, as described below. The recess 70 has a second orientation relative to vertical, or to the valve body 22, different from the first orientation, when the button 30 is in any one of a second group of angular (rotational) positions relative to the valve body 22, as described below In the illustrated embodiment, the recess 70 has an "ovalized square" configuration, that is, the general configuration of a square with four rounded corners 74 between four flat sides 76. Other configurations may be possible.

The barrel 62 of the button 60 has a tubular, cylindrical shape adapted to fit over the plunger 30. An internal rim 80 on the barrel 62, near the engagement portion 64 of the button, is engageable with the flex arms 38 of the plunger 30, as described below, to secure the button to the plunger.

At the opposite end of the barrel 62 (FIG. 4) from the engagement portion 64 is a detent portion including a plurality of slots 82. The slots 82 are engageable with the detents 50 on the plunger 30, to set the rotational (angular) position of the button 60 on the plunger. In the illustrated embodiment, eight slots 82 are provided, spaced apart at forty five degree intervals around the axis 32.

In FIGS. 5 and 6, a first group of four of the slots 82 are labeled with the reference numeral 84. A second group of four of the slots are labeled with the reference numeral 86. The slots 84 alternate with the slots 86.

A plurality of labels 90 and 96 are provided for use with the operators 10 and 10a of the valves 20 and 20a. The labels may have the same shape (outer periphery) as each other. The size and shape of the labels preferably matches the size and shape of the recess 70 in the engagement portion 64 of the button 60. Thus, the label 90 has four rounded corners 92 between four flat sides 94. The label 96 has four rounded corners 98 between four flat sides 100.

Indicia are printed on the labels. Different labels have different indicia printed on them. For example, the label 96 has indicia indicating that it is used for park brake control, and the label 90 has indicia indicating that it is used for trailer air supply control.

The indicia on the labels are printed in particular orientations relative to the outer periphery of the labels. Thus, the indicia for the trailer supply label 90 include a red octagon 102 that has flat sides 104 disposed radially inward of and parallel to the flat sides 94 of the "ovalized square" configuration of the label 90. The indicia for the park brake label 96 include a yellow diamond 110 that has flat sides 112 disposed radially inward of the flat sides 98 of the "ovalized square" configuration of the label 96.

The button 60 (FIG. 4) is assembled on the plunger 30 by moving it axially over the plunger, in a direction toward the body 22 of the valve 20. As the internal rim 80 on the barrel 62 of the button 60 reaches the cam surfaces 42 on the flex arms 38 of the plunger 30, the rim moves the flex arms radially inward, until the rim moves axially past the cam surfaces. The flex arms 38 then spring or snap radially outward, and the shoulder surfaces 44 on the arms 38 engage the rim 80 on the button 60. The snap fit of the button 60 on the plunger 30 is complete.

At about the same time as the button 60 reaches the point on the plunger 30 at which the rim 80 moves behind the cams 42, the slots 82 on the end of the button barrel 62 reach the detent portion 48 of the plunger. The button 60 is then manually rotated until the desired pair of diametrically opposed slots 82 engages the pair of detents 50 of the plunger 30—that is, until the button is indexed or rotated to the desired position on the plunger.

The presence of the slots 82 allow the inner end portion of the barrel 62 of the button 60 to deform so that the material portions between the slots deflect as the button is rotated around the detents. The button 60 can thus rotate on the plunger 30, until the desired angular orientation of the button relative to the plunger is reached. Other types of detent or indexing mechanisms can be provided as an alternative. The desired label is then (or previously) placed in the label recess 70 on the button 60 and adhered there.

The engagement of the rim 80 on the button 60, behind the cams 42 of the plunger 30, resists removal of the button from the plunger. The button 60 can be removed only by forcing the two flex arms 38 radially inward, toward each other. This can be done only by manual engagement of the flex arms 38. The flex arms 38 can be manually engaged only by removing the label 90. As a result, this arrangement of the label 90, button 60, and plunger 30 provides a significant degree of deterrence, or resistance, to removal of the button (and to possible swapping with another button).

Because there are eight slots 82 in the inner end portion of the barrel 62 of the button 60, there are eight possible angular positions or index positions of the button relative to the plunger 30. There are thus eight possible angular positions of the label recess 70, and its associated label 90 or 96, relative to the plunger 30, at forty five degrees apart.

Accordingly, the label recess 70, which has an ovalized square configuration, can be oriented so that any one of its flat sides 76 is horizontal and uppermost, or can be oriented so that any one of its "points" or "rounded corners" 74 is uppermost. In four of these orientations, the flat sides 76 of the recess 70 are horizontal, while in the other four orientations, the points 74 of the recess are at the top and bottom of the recess. Thus, there are two separate groups of four index positions, defined by the engagement of the detent portion 48 of the plunger 30 with the detent portion of the button 60.

Figure 3:
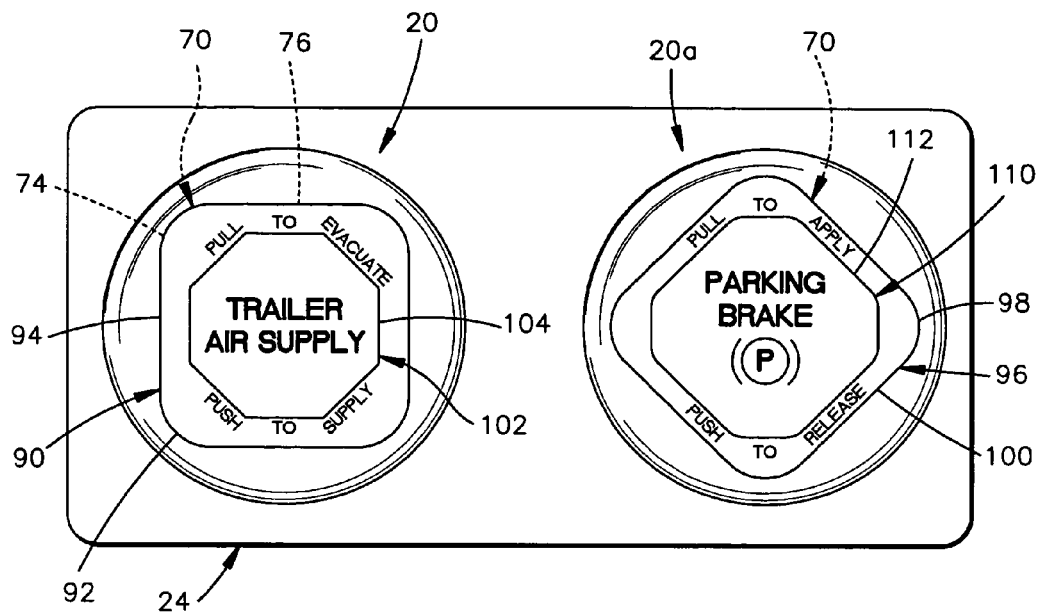
FIG. 3 is a front elevational view of the valve assembly of FIG. 2, showing the two operators with different labels bearing different indicia.

This variety of orientations works together with the two different label configurations provided as 90 and 96. Specifically, the one label configuration 90 when oriented as shown in FIG. 3 presents the appearance of an octagon. The label 96 when oriented as shown in FIG. 3 presents the appearance of a diamond. These are configurations that are in some cases required by regulation or industry standard. In this manner, one button 60 can receive either one of two different labels and, by indexing the button properly on the plunger 30, can present either one of two substantially different appearances to the user. Other label indicia and configurations are possible.

As discussed above, the button 60 is adapted to be fitted on the plunger 30 with a snap fit. The button 60 is, in addition, adapted to be mounted on a different style of plunger—that is, an operator plunger having different means for mounting the button on the plunger. An example of this is shown in FIG. 7, in comparison with FIG. 3.

The plunger 30a shown in FIG. 7 has an externally threaded outer end portion 110, for receiving a button 60 to be screwed onto the plunger. The barrel 62 of the button 60 has an internal thread 112 adapted to engage the external thread 110 on the plunger 30a. The internal thread 112 is displaced axially from the internal rim 80 on the button 60.

When the button 60 is mated with the second plunger 30a, the internal threads 112 on the button engage the external thread 110 on the plunger, to secure the button to the plunger. The button 60 can be indexed on the plunger 30a, before the threads bottom out.

The internal threads 112 on the button 60 do not interfere with the alternative snap fit connection of the button 60 on the plunger 30. Specifically, the internal threads 112 are of a diameter to move past the flex arms 38 during assembly of the button 60 onto the plunger 30. As a result, one individual button 60 can be secured to a plunger 30 of the type shown in FIGS. 1-6 via the snap fit connection described above, or alternatively to a plunger 30a of the type shown in FIG. 7 via a threaded connection. In each case, the button 60 is indexable on the plunger 30 or 30a, at forty five degree increments.

Specific dimensions of one particular embodiment of the "ovalized square" design are as follows. The one particular embodiment has an overall width (flat side to opposite flat side) of about 1.3 to 1.5 inches, for example, 1.395 inches plus or minus 0.005 inches. The four rounded corners form arcs of a single circle having a diameter of about 1.1 to 1.2 inches, for example, 1.155 inches plus or minus 0.005 inches. Applicant has found that these dimensions are helpful but not necessary in obtaining the benefits and advantages of this designs. The benefits include those noted above. This shape can reasonably present the appearance of either an octagon or a diamond in a common button. The label text and graphics dominate the visual projection as compared to the underlying fact of a common label shape.

From the above description of the invention, those skilled in the art will perceive improvements, changes, and modifications in the invention. For example, other types of air flow control device operators are usable. Thus, the invention is applicable to a plunger for an electric switch that controls an air valve; to a manually controlled electric switch located in, for example, a vehicle dashboard, that provides electric current to a solenoid (near or remote) or valve that the provides the control of the air flow. Such improvements, changes, and modifications within the skill of the art are intended to be included within the scope of the appended claims.

Having described the invention, we claim:

1. A button for an operator for an air flow control device, comprising:

a hub portion for mounting on a plunger of the operator; and an engagement portion for manual engagement to apply force in a direction along the length of the plunger;

the engagement portion of the button having a non-circular label area that is adapted to receive a non-circular label for the operator, with the non-circular label area being configured to present a diamond shape to a viewer of the button in a first mounted orientation on the plunger, and an octagon shape to the viewer in a second mounted orientation on the plunger, with the second mounted orientation being approximately 45 degrees from the first mounted orientation.

2. A button as set forth in claim 1 having a detent portion for enabling indexing of the button on the plunger.

3. A button as set forth in claim 2 wherein the button is indexable at forty-five degree increments on the plunger.

4. A button as set forth in claim 1 wherein the engagement portion of the button has a circular outer periphery with the non-circular recess formed as an ovalized square.

5. A button as set forth in claim 4 wherein the ovalized square recess has opposite flat sides and four rounded corners that form arcs of a single circle.

6. A button as set forth in claim 5 wherein the non-circular recess has a width between opposite flat sides of about 1.3 to 1.5 inches, and wherein the four rounded corners form arcs of a single circle having a diameter of about 1.1 to 1.2 inches.

7. A button as set forth in claim 6 wherein the non-circular recess has a width between opposite flat sides of about 1.395 inches and wherein the four rounded corners form arcs of a single circle having a diameter of about 1.155 inches.

8. A button as set forth in claim 1 wherein the button includes a non-threaded securing portion for securing the button axially to the plunger, the securing portion being located behind the label area to limit access to the securing portion when a label is received on the label area.

9. A button as set forth in claim 8 having a detent portion for enabling indexing of the button on the plunger at 45° increments on the plunger.

10. A button as set forth in claim 8 further including a threaded securing portion for securing the button to a second type of plunger.

* * * * *

UNITED STATES PATENT AND TRADEMARK OFFICE
CERTIFICATE OF CORRECTION

PATENT NO. : 7,568,677 B2  Page 1 of 1
APPLICATION NO. : 11/448693
DATED : August 4, 2009
INVENTOR(S) : Geither et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 410 days.

Signed and Sealed this

Seventh Day of September, 2010

David J. Kappos
*Director of the United States Patent and Trademark Office*